United States Patent [19]

Lewis et al.

[11] Patent Number: 4,534,795

[45] Date of Patent: Aug. 13, 1985

[54] LONG SHELF LIFE CEMENTITIOUS ANCHORING CAPSULE

[76] Inventors: Christopher G. Lewis, 27 Dunster Ct., Furzton, Milton Keynes, Buckinghamshire, England, MK4 1DG; Patrick Martin, 26 The Orchard, Fen Drayton, Cambridgeshire, England, CB4 5SN

[21] Appl. No.: 566,131

[22] Filed: Dec. 28, 1983

[30] Foreign Application Priority Data

Jan. 5, 1983 [GB] United Kingdom ............... 8300166

[51] Int. Cl.³ .................... C04B 7/35; E21D 20/02
[52] U.S. Cl. ............................ 106/89; 106/90; 106/97; 106/104; 106/109; 106/111; 405/261
[58] Field of Search ............... 106/89, 90, 97, 98, 106/104, 109, 111; 405/261

[56] References Cited

U.S. PATENT DOCUMENTS

| | | | |
|---|---|---|---|
| 4,126,005 | 11/1978 | Coursen | 106/90 |
| 4,352,693 | 10/1982 | Langdon | 106/104 |
| 4,362,566 | 12/1982 | Hinterwaldner | 106/97 |

*Primary Examiner*—William R. Dixon, Jr.
*Assistant Examiner*—Steven Capella
*Attorney, Agent, or Firm*—Caesar, Rivise, Bernstein & Cohen, Ltd.

[57] ABSTRACT

A long shelf life cementitious anchoring capsule having a separate compartment with interactive base and catalyst components. The base component comprises cement and water, and the catalyst component comprises a catalyst and water. The base component also includes cement particles coated with a water insoluble coating and an additive to complex any calcium ion released from the cement into solution. The catalyst component also includes a material which will interact with the insoluble coating to release cement particles to allow self-setting to take place.

12 Claims, No Drawings

LONG SHELF LIFE CEMENTITIOUS ANCHORING CAPSULE

The invention relates to an anchoring capsule of the type used in the construction, civil engineering and mining industry to anchor an element in a hole in a substrate. In particular the invention relates to a capsule which contains the interactive components of a self setting cementitious composition. The invention also includes a cement composition therefor.

In our PCT patent application number GB No. 79/00080, publication WO. No. 79/01144, we have described and claimed a capsule based on an inorganic self-setting composition comprising e.g. a cement, and in which the capsule contains a dry powder and the hardener therefor, typically water, is allowed to enter the capsule when required via holes in the capsule wall. This capsule based on an inorganic self-setting composition has proved to be very acceptable, since a supply of water is usually present at the site of use.

A need has arisen for a capsule having the merits of an inorganic self-setting composition but which contains within the capsule wall the required amount of water. The development of such a capsule has presented several problems, in particular the need to provide the capsule with an acceptable shelf life since if the water within the capsule reacts with the cement prematurely hardening of the composition will take place and the shelf life will be too short.

It has been realised that there is a need for a delayed set water-containing cementitious composition. One proposal is described in British patent application No. 82.34980 lodged before the priority date of this application but published in the priority interval, under No. 2111041A on June 29, 1983. That proposal relies on the use of a base component comprising a high alumina cement and water and a set inhibiting agent to be reacted with a catalyst component comprising water and a lithium salt. The base and the catalyst component are extruded into separate compartments of one capsule. Our evaluations have established that the shelf life of these capsules is limited, often of the order of two months.

This invention is based on the appreciation that the cement component has a short shelf life and that by suitably treating the cement particles one can locate all the interactive components of an inorganic self-setting composition within a capsule and still have an acceptable shelf life, often of the order of 6 months even when the capsule is stored at 20° C.

According to one aspect of the invention there is provided a frangible anchoring capsule containing in separate compartments the interactive base and catalyst components of a self-setting cementitious composition, the base component comprising a cement and water, and the catalyst component comprising a catalyst and water characterised in that
  (i) the base component includes cement particles coated with a water insoluble coating and an additive to complex any calcium ion released from the cement into solution, and
  (ii) the catalyst component includes a material which will interact with the insoluble coating to release cement particles to allow self-setting to take place.

Our investigations have shown that to the cement component may be added an additive material preferably made of two ingredients, one of which will form insoluble coating on the cement particles and the other of which will form a complex ligand with calcium ions. The coating may be an insoluble hydroxide and/or borate or any other suitable salt or ester. Any sequestrant may be used as the complexing agent provided that it will remove calcium ions from the solution.

Most preferably the coating material is a borate, most preferably zinc borate, and the complexing agent is an organic material such as a gluconate, heptonate, alpha hydroxycarbonyl, other sugars or ethylene diamine tetraacetic acid and salts thereof. A preferred combination is zinc borate and disodium ethylene diamine tetraacetic acid. Most surprisingly we have found that provided both ingredients are used together and in certain relative proportions, the resulting capsule has an extended shelf life. Our investigations have shown that the ratio of the coating and complexing ingredients should be about 3:5 by weight.

Most preferably, the cementitious material in the composition is so-called high alumina cement. This material is known under a variety of names in different countries, for example "Cement Fondue" and "alumina cement" or "super alumina cement". The content of alumina in the cement varies from country to country, sometimes being as low as 30% and other times being over 77%. The invention is applicable to all such high alumina cements.

The catalyst component most preferably comprises a catalyst for the cement together with a base material which, under the conditions of the reaction, will release the coating from the cement particles to allow the catalyst to act. The material is preferably a base such as lime. A catalyst for the high alumina cement is preferably a lithium derivative which is preferably lithium carbonate, lithium sulphate or lithium hydroxide. Any lithium salt may be used provided it is water soluble and compatible with the other ingredients. It is preferred to include in the catalyst component a sequestrant which complexes the calcium ions of the lime weakly and which will not retard setting when the components are mixed. Trisodium nitrilotriacetate, which will prevent the lime from forming a thick paste, in a proportion of about 0.5 to 2 parts relative to the base, is preferably present.

In a preferred aspect, therefore, the invention is characterised by the fact that
  (i) the base component comprises a paste formed of cement particles coated with borate, preferably zinc borate, and contains a sequestrating agent to complex cement ions e.g. ethylene diamine tetra-acetic acid, the ratio of borate to sequestrating agent being about 3:5 by weight, and
  (ii) the catalyst component comprises a paste formed of a lithium salt and calcium hydroxide and a sufficient sequestrant to prevent the calcium from forming a thick paste e.g. trisodium nitrilotriacetate,
whereby the capsule has an extended shelf life.

The base component preferably has a pH of the order of about 8.5. When components are mixed the set composition will have a pH of the order of about 11.

The composition may include other ingredients, e.g. water reducing agents, expanding agents, surfactants, colourants, latex emulsions, anti-foaming agents and plasticisers. Other accelerators may be present, e.g. sodium carbonate, sodium sulphate, calcium chloride, sodium hydroxide, ferrous sulphate, sulphuric acid, acetic acid, calcium sulphate, etc. A thixotropic, thickening agent or air entraining agent may be present if water bleed on storage and a loss of grout composition is to be minimised, a point especially important in overhead or fissured rock applications. Polymeric or montmorillonite type clays or cellulose ethers are preferred thixotropic agents.

The capsule may be of any suitable shape so long as the two interactive components are in separate compartments for storage. When required and in known manner, an anchoring element is used to rupture the capsule, open the compartments and intermix the interactive components. The capsule may range from 20 to 40 mm in diameter and 200 to 600 mm in length, and may be used in boreholes ranging from about 25 mm to about 50 mm in diameter. The boreholes may be drilled in the wall or roof of a coal mine, gold mine, iron ore mine, quarry or civil engineering structures.

The invention further includes, for use in the capsule or in bulk, a self-setting cementitious composition comprising a cement base component comprising cement particles coated with a water insoluble coating and including an additive to complex any calcium ion released from the cement into solution, and a catalyst component therefor including a material which will interact with the insoluble coating to release cement particles to allow self-setting to take place when the cement and catalyst are mixed. Such bulk compositions may be used in capsules and independently, e.g. in concrete repair work.

The invention is illustrated by the following examples in which parts are by weight.

EXAMPLES I AND II

Capsules were filled with the pastes in the accompanying Table I and the defined proportions. Each was used to satisfactorily anchor a bolt in a borehole. Capsules were stored at 20° C. for three months and then used to anchor bolts with satisfactory results obtained.

EXAMPLE III

The composition of Example I was tested for set strengths and the following values were obtained:
Initial set (Vicat apparatus)—4 minutes at 20° C.

TABLE II

| Age (hours) | 1 | 2 | 6 | 24 |
|---|---|---|---|---|
| Shear strength N/sq mm | 3 | 4.5 | 6.75 | 9 |

EXAMPLE IV

A 400 mm deep hole was drilled using a rotary percussive air flush drill with a 43 mm diameter bit. Two compartment capsules according to Example I were used to anchor a length of 32 mm diameter concrete reinforcing bar. The anchorages were subjected to a uniaxial pull out load and the following results were obtained.

| Period of testing after anchoring: | 30 minutes | 24 hours |
|---|---|---|
| load at failure: | 10 tonnes | 20 tonnes |

In both cases the failure was at the bar/grout interface.

EXAMPLE V

Capsules were made up using the additives specified in the accompanying Table III and subjected to accelerated shelf life testing at elevated temperature to give a guide to the shelf life in industrial conditions. The period to reach initial set was noted and the result was expressed relative to a control in which no additives were present. The results are shown in Table III from which it can be seen that in the case of the invention there was a relatively long period before initial set took place, indicating a shelf life under industrial conditions in excess of 6 months.

EXAMPLE VI

Example IV was repeated using a cement composition in which the 2.5 parts of disodium ethylene diamine tetra acetic acid was replaced by 1.25 parts of sodium heptanoate. A pull out test was done 30 minutes after mixing when the anchorage failed at the bar/grout interface under a load of 11 tonnes.

TABLE I

|  | Example I | Example II |
|---|---|---|
| Paste A (base) | | |
| high alumina cement | 100 | 100 |
| water | 25 | 16.75 |
| zinc borate | 1.5 | 1.6 |
| disodium ethylene diamine tetra acetic acid | 2.5 | 2.2 |
| thickener | 0.1 | 0.8 |
| dispersing agent | 0 | 4.0 |
| Paste B (catalyst) | | |
| calcium hydroxide | 50 | 60 |
| water | 40 | 55 |
| lithium hydroxide | 11 | 4.9 |
| trisodium nitriloacetate | 1.0 | 2.3 |
| magnesium sulphate | 0 | 3.8 |
| Ratio of paste A:paste B | 7:1 | 6:1 |

TABLE III

| Coating Agent | Sequestrant | Result |
|---|---|---|
| None | None | 5 |
| 1.0 parts boric acid | 1.0 parts EDTA* | 600 |
| 1.5 parts copper borate | 1.5 parts EDTA* | 600 |
| 1.5 parts zinc borate | 0.75 parts citric acid | 800 |
| 1.5 parts zinc borate | 2.5 parts EDTA** | 1100 |
| 1.5 parts zinc borate | 1.25 parts sodium heptanoate | 1200 |

*EDTA = disodium ethylene diamine tetraacetic acid
**this corresponds to Example I above.

We claim:
1. A frangible anchoring capsule containing in separate compartments an interactive base and catalyst component of a self-setting cementitious composition, the base component comprising a cement and water, and the catalyst component comprising a catalyst and water, in which
   (i) the base component includes cement particles coated with a water insoluble coating and an additive to complex any calcium ion released from the cement into solution, and
   (ii) the catalyst component includes a material which will interact with the insoluble coating to release cement particles to allow self-setting to take place.

2. A capsule according to claim 1, in which the insoluble coating formed is an insoluble hydroxide and/or borate.

3. A capsule according to claim 1 or 2, in which the coating agent is a borate, and the complexing agent is an organic material selected from the group consisting of a gluconate, heptonate, alpha hydroxycarbonyls, ethylene diamine tetraacetic acid and salts thereof.

4. A capsule according to claim 3, in which the coating agent is zinc borate and the complexing agent is a disodium ethylene diamine tetraacetic acid or sodium heptanoate.

5. A capsule according to claim 3, in which the ratio of the coating agent to complexing agent is about 3:5 by weight.

6. A capsule according to claim 3, in which the cementitious material is high alumina cement and the catalyst is a lithium derivative.

7. A capsule according to claim 3, in which the coating release material present in the catalyst component comprises a base selected from the group of calcium hydroxide and magnesium sulphate.

8. A capsule according to claim 7, in which a sequestrant material which prevents the calcium hydroxide from forming a thick paste is present.

9. A capsule according to claim 8, in which the sequestrant material is trisodium nitrilotriacetate.

10. A frangible anchoring capsule containing in separate compartments the interactive base and catalyst components of a self-setting cementitious composition, the base component comprising a cement and water, and the catalyst component comprising a catalyst and water, in which
  (i) the base component comprises a paste formed of water and cement particles coated with zinc borate, and contains ethylene diamine tetraacetic acid, the ratio of borate to ethylene diamine tetraacetic acid being about 3:5 by weight, and
  (ii) the catalyst component comprises a paste formed of water and a lithium salt and calcium hydroxide and trisodium nitrilotriacetate.

11. A self setting composition comprising a cement base and a catalyst thereof, in which the cement base component comprises cement particles coated with a water insoluble coating and including an additive to complex any calcium ion released from the cement into solution, and in that the catalyst component therefor includes a material which will interact with the insoluble coating to release cement particles to allow self setting to take place when the cement and catalyst are mixed.

12. A self setting composition according to claim 11, in which
  (i) the base component comprises a paste formed of water and cement particles coated with zinc borate, and contains ethylene diamine tetraacetic acid, the ratio of borate to ethylene diamine tetraacetic acid being about 3:5 by weight, and
  (ii) the catalyst component comprises a paste formed of water and a lithium salt and calcium hydroxide and trisodium nitrilotriacetate.

* * * * *